Aug. 26, 1930.  A. M. HUDSON ET AL  1,774,375
CIRCUIT CLOSER FOR RIGHT AND LEFT TURN SIGNALS
Filed Oct. 11, 1927  2 Sheets-Sheet 1
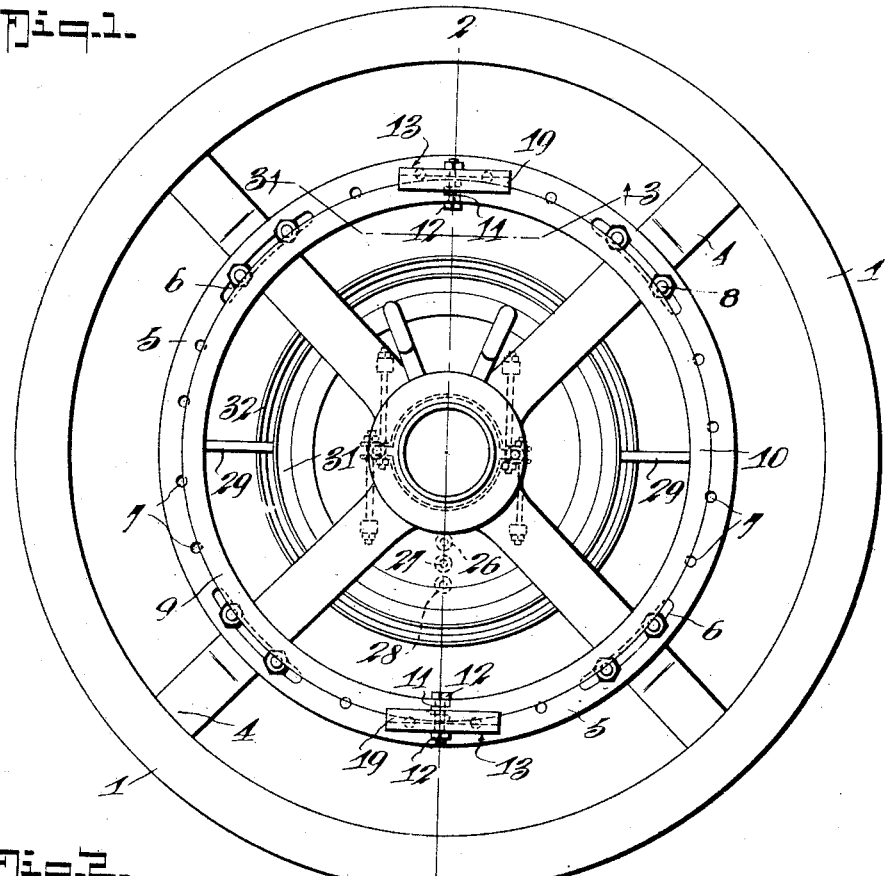
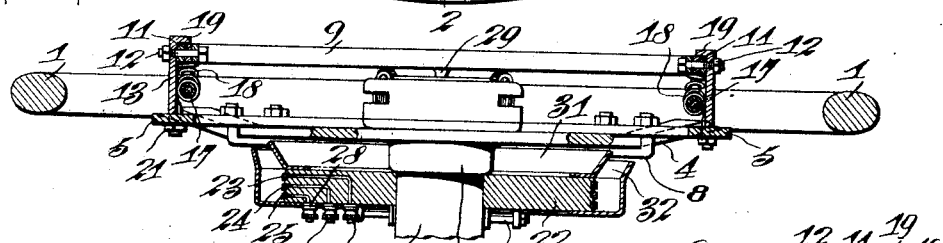
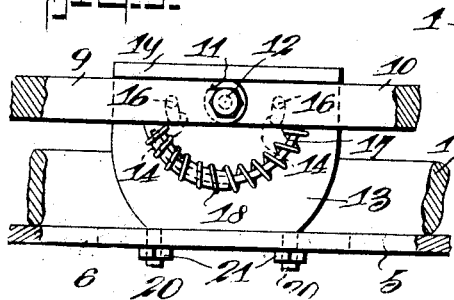
INVENTOR
Alex. M. Hudson
C. H. Twetten
BY
Albert E. Dulinsh
ATTORNEY Aug. 26, 1930. A. M. HUDSON ET AL 1,774,375
CIRCUIT CLOSER FOR RIGHT AND LEFT TURN SIGNALS
Filed Oct. 11, 1927   2 Sheets-Sheet 2
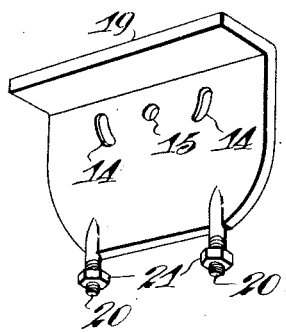
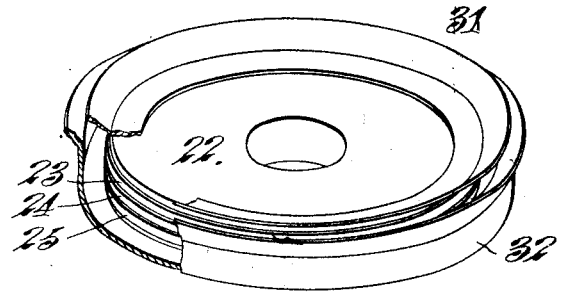
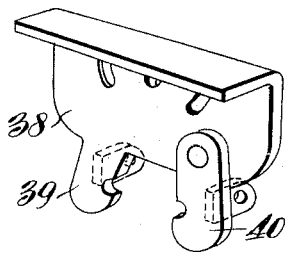
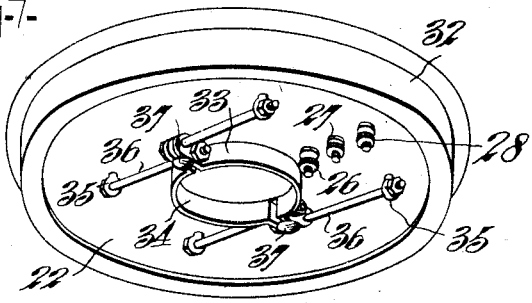
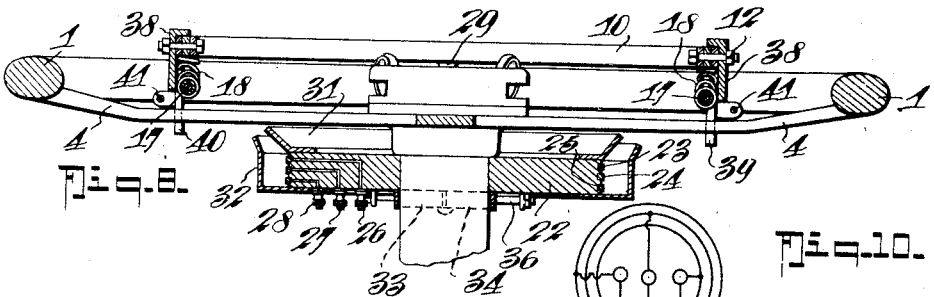
INVENTOR
Alex. M. Hudson
Clarence H. Twetten.
BY
Albert E Dietrich
ATTORNEY Patented Aug. 26, 1930

1,774,375

UNITED STATES PATENT OFFICE

ALEXANDER M. HUDSON AND CLARENCE H. TWETTEN, OF ROUND LAKE, MINNESOTA

CIRCUIT CLOSER FOR RIGHT AND LEFT TURN SIGNALS

Application filed October 11, 1927. Serial No. 225,498.

Our invention relates to the art of electric signalling and more particularly to electrically operated signals for indicating right and left turns of motor vehicles, in order to warn other approaching vehicles.

Primarily the invention has for an object to provide means located upon the steering post and steering wheel for closing, properly, the circuit connections of the respective right and left signals without the necessity of the operator removing his hands from the wheel.

Further, it is an object to provide a circuit controller that is adapted to all sizes and types of steering wheels.

Further, the invention has for its object to provide a distributor fixed upon the steering post adjacent the wheel and a sectional ring supported on the steering wheel and having circuit closing elements cooperating with the distributor and so arranged that either section of the ring may be pressed to close the signal circuit which it is individually intended to operate.

The invention further has for its object to provide a simple, effective, inexpensive-to-manufacture, light, durable device of a neat construction so arranged and designed as not to mar or detract from the appearance of the steering wheel assembly or in any way interfere with its operation.

Other objects will in part be obvious and in part be pointed out hereinafter.

To the attainment of the aforesaid objects and ends, our invention consists in the novel features of construction, combination and arrangement of parts, all of which will be first fully described in the following detailed description, then be particularly pointed out in the appended claims, reference being had to the accompanying drawings, in which:

Figure 1 is a plan view of a steering wheel with our invention applied.

Figure 2 is a section on the line 2—2 of Figure 1.

Figure 3 is an enlarged section and part elevation on the line 3—3 of Figure 1.

Figure 4 is an enlarged detail perspective view of one of the supports for the sectional ring looking at it from the inner side.

Figure 5 is a detail perspective view of the ring-like adapter.

Figure 6 is a perspective view of the distributor looking from above.

Figure 7 is a perspective view of the distributor and its attaching means looking from beneath.

Figure 8 is a detail longitudinal section of a straight spoke steering wheel with the invention applied, the adapter being omitted.

Figure 9 is a detail perspective view of one of the combined clamp and ring supporting members used in the embodiment of the invention illustrated in Figure 8.

Figure 10 is a diagrammatic view of the light circuits showing the relation thereof to the distributor.

Figure 11 is a detail section showing the contact roller in operation.

In the drawings, in which like numerals indicate like parts in all of the figures, 1 designates the steering wheel, 2 the post, 3 the wheel shaft and 4 the spoke of the wheel, all of which may be of any of the usual constructions.

Where the spokes of the wheel do not lie normally in a vertical front and back alignment we provide a ring-like adapter 5 having slots 6 and apertures 7, the adapter being secured to the spokes 4 of the wheel by suitable clamps 8 which cooperate with the slot 6 in order that the adapter may be shifted for adjustment on the wheel and in order that the pivotal axis of the ring sectors 9 and 10 may lie in a straight forward and backward direction when the vehicle is moving straight forward.

The circuit controlling ring sectors 9 and 10 are connected at their ends by a hinge joint 11, the bolts 12 of which constitute a means by which the ring sectors may be mounted on the supports 13, the bolts passing through the apertures 15 and being suitably secured by nuts.

13 designates the circuit controlling ring supports. These consist of plates having arcuate blind slots 14, i. e., the slots 14 preferably do not go entirely through the plate so that they are not visible from the outside. Stop pins 16 are provided on the ring sectors 9 and 10 to cooperate with the slots 14 and limit the pivotal movement of the sectors on the axis passing through the bolts 12.

Each sector 9 and 10 has a cooperating telescopic spring holder 17 on which springs 18 are located to continuously tend to move the sectors 9 and 10 on their axis in an upward direction, the movement being limited by the engagement of the pins 16 with the upper limits of the slots 14 and by contact with the stop flanges 19 formed on the supports 13, as shown.

The supports 13 have threaded shanks 20 that pass through the apertures 7 of the adapter. In practice the apertures 7 are preferably spaced apart a distance equal to the width of a spoke of the steering wheel, this being found to give the best range of adjustments.

21 are nuts which secure the shanks 20 to the adapter 5 in a rigid manner.

Mounted beneath the steering wheel and on the steering post column but as close as practicable to the steering wheel is a distributor composed of a body 22 preferably of insulation, which body has three peripheral contact rings 23, 24 and 25, respectively, these rings being electrically connected to the respective terminal posts 26, 27 and 28.

29 designates arms projecting from the ring sectors 9 and 10 at diametrically opposite points, the arms 29 carrying rollers 30. One arm 29 has its roller 30 so disposed as to close the circuit between the central contact ring 24 and the adjacent ring 23 while the other arm has its roller arranged to close the circuit between the central contact ring 24 and the other ring 25. Normally, however, both contact rollers 30 are out of engagement with any of the contact rings of the distributor, the arms 29, however, being so bent that the rollers 30 will remain in juxtaposition with the rings both out of contact therewith when the ring sectors 9 and 10 lie in the same plane.

In order to prevent the operator from getting a shock the arms 29 are preferably of insulation and suitable guards (upper and lower) 31 and 32 are secured to the distributor body 22 and are arranged to enclose the roller 30 and the contact rings 23, 24 and 25.

In order to secure the distributor body against movement on the steering post I provide a pair of half clamp members 33—34 through which suitable clamp bolts pass, the clamp bolts 36 also pass through eyes 35 under the body 22. Bracing bolts 37 are located between the ends of the half clamp members and serve to secure them in close juxtaposition to the body 22.

Where the steering wheel spokes are straight up and down, or are in front and back alignment the adapter 5 may frequently be dispensed with and in such cases we modify the structure of the ring sector as indicated at 38 in Figure 9. In this modification the support 38 has one half 39 of a clamp formed integrally while the other half 40 of the clamp is hinged to the support 38, clamping bolts 41 passing through the same to draw the clamp arms 39 and 40 together into tight gripping engagement with the spoke 4 of the wheel to which it is attached. In this fashion the ring-like sectors are directly mounted on the spokes of the steering wheel, whereas in the first embodiment of our invention they are mounted on the adapter which is in turn mounted on the spokes of the wheel.

In the practical application of our invention one post 27 of the distributor is connected to the storage battery 43 through a connection 42, the storage battery being grounded to the frame of the car as is also one terminal 44 of each of the right and left signal elements 45, 46, respectively, the other terminal of the "right" signal lamp 45 being connected by a wire 47 to the post 26 while the other terminal of the "left" signal 46 is connected to the post 26 by a wire 48.

It will thus be seen that when the operator desires to indicate a "left" turn he presses upon the ring sector 9 with the thumb of his left hand, whereas should he desire to make a right hand turn and give a "right" indication he presses upon the sector 10 with the thumb of his right hand. It is unnecessary, of course, to remove the hand from the steering wheel, thus leaving the operator free for the control of his car and yet enable him, almost automatically, to give the required turn signal.

Instead of making the arms 29 themselves of insulating material they can be made of a metallic substance, in which event the roller 30 on the end of the arm will be composed of a core of insulating material carrying a peripheral band of metallic structure so as to close the circuit between the distributor rings with which it cooperates.

From the foregoing description, taken in connection with the accompanying drawings, it is thought that the complete construction, operation and advantages of our invention will be clear to those skilled in the art to which it relates, and we desire it understood, of course, that slight changes in the details of structure, arrangement and design of parts, as well as materials used, may be made without departing from the spirit of the invention or the scope of the appended claims.

What we claim is:

1. In apparatus of the character described wherein is provided a steering wheel post and a steering wheel having spokes and being rotative relatively to the post: a circuit controlling device comprising a distributor fixed to the post, a sectional ring, means pivoting the ring sections together, means for supporting said ring sections on the spokes of said steering wheel for pivotal movement and circuit controlling arms carried by said ring sections and associated with said distributor for the purposes specified.

2. In apparatus of the character described wherein is provided a steering wheel post and a steering wheel having spokes and being rotative relatively to the post; a two-part ring, the parts of which are hinged together along a common axis, means supporting said ring on the spokes of said steering wheel to permit its parts separately to pivot on its axis, yielding means continuously tending to hold said ring parts in a common plane, a contact arm on each ring part, and a distributor secured to said steering post and with which said arms are associated to effect a closure of the circuit between one or another pair of distributor contacts for the purposes specified.

3. In apparatus of the character described wherein is provided a steering wheel post and a steering wheel rotative relatively to the post; a circuit controlling device comprising a distributor fixed to the post, a sectional ring, means pivoting the ring sections together, means for supporting said ring sections on the steering wheel for pivotal movement, circuit controlling arms carried by said ring sector and associated with said distributor, said supporting means comprising a pair of supporting members having bolt holes, pivot bolts securing said ring sections to said supporting members, stop pins on said ring sections and slots in said supporting members in which said pins operate.

4. In apparatus of the character described wherein is provided a steering wheel post and a steering wheel rotative relatively to the post; a two-part ring, the parts of which are hinged together along a common axis, means supportsing said ring on a steering wheel to permit its parts separately to pivot on its axis, yielding means continuously tending to hold said ring parts in a common plane, a contact arm on each ring part, a distributor secured to said steering post and with which said arms are associated to effect a closure of the circuit between one or another pair of distributor contacts, said supporting means comprising a pair of supporting members having bolt holes, pivot bolts securing said ring sections to said supporting members, stop pins on said ring sections and slots in said supporting member in which said pins operate.

5. In apparatus of the character described wherein is provided a steering wheel post and a steering wheel rotative relatively to the post; a circuit controlling device comprising a distributor fixed to the post, a sectional ring, means pivoting the ring sections together, means for supporting said ring sections on the steering wheel for pivotal movement, circuit controlling arms carried by said ring sector and associated with said distributor, said supporting means comprising a pair of supporting members having bolt holes, pivot bolts securing said ring sections to said supporting members, said supporting members having flanges overlying said ring sections to serve as stops and hold said ring sections from passing their common plane except in one direction.

6. In apparatus of the class described wherein is provided a steering wheel post and a steering wheel rotative relatively to the post; a two-part ring, the parts of which are hinged together along a common axis, means supporting said ring on a steering wheel to permit its parts separately to pivot on its axis, yielding means continuously tending to hold said ring parts in a common plane, a contact arm on each ring part, a distributor secured to said steering post and with which said arms are associated to effect a closure of the circuit between one or another pair of distributor contacts, said supporting means comprising a pair of supporting members having bolt holes, pivot bolts securing said ring sections to said supporting members, said supporting members having flanges overlying said ring sections to serve as stops and hold said ring sections from passing their common plane except in one direction.

7. In apparatus for the purposes specified wherein is provided a steering wheel, a steering wheel post, pivotally movable circuit controlling members carried by the wheel and having rigidly attached arms associated with a distributor fixed on the steering wheel; the distributor comprising a disk of non-conducting material, a plurality of contact rings on said disk to which circuit terminal connections may be made, one of said arms being associated with two of said rings only and the other of said arms being associated with two of said rings only, and guards located on said disk for the purposes specified.

8. In apparatus of the character described wherein is provided a steering wheel post and a steering wheel rotative relatively to the post; a circuit controlling device comprising a distributor fixed to the post, a sectional ring, means pivoting the ring sections together, means for supporting said ring sections on the steering wheel for pivotal movement, circuit controlling arms carried by said ring sector and associated with said distributor, said ring supporting means including an adapter, means fastening said adapter to said steering wheel, and ring supports mounted on said adapter for sustaining said ring.

9. In apparatus of the character described wherein is provided a steering wheel post and a steering wheel rotative relatively to the post; a two-part ring, the parts of which are hinged together along a common axis, means supporting said ring on a steering wheel to permit its parts separately to pivot on its axis, yielding means continuously tending to hold said ring parts in a common plane, a contact arm on each ring part, a distributor having a plurality of contacts secured to said steering post and with which said arms are associated to effect a closure of the circuit between one or another pair of distributor contacts, said ring supporting means including an adapter, means fastening said adapter to said steering wheel, and ring supports mounted on said adapter for sustaining said ring.

10. In apparatus of the character described wherein is provided a steering wheel post and a steering wheel rotative relatively to the post; a circuit controlling device comprising a distributor fixed to the post, a sectional ring, means pivoting the ring sections together, means for supporting said ring sections on the steering wheel for pivotal movement, circuit controlling arms carried by said ring sector and associated with said distributor, said ring supporting means including an adapter, means fastening said adapter to said steering wheel, ring supports mounted on said adapter for sustaining said ring, said adapter comprising a ring having slots, clamps associated with said slots for securing said adapter ring to the spokes of a steering wheel, said adapter ring having a series of apertures for adjustably securing said ring supports.

11. In apparatus for the purposes specified wherein is provided a steering wheel, a steering post, pivotally movable circuit controlling members carried by the wheel and having rigidly attached arm associated with a distributor fixed on the steering wheel post; said distributor comprising a disk, three insulated conductor rings on the periphery of said disk, means for connecting said conductor rings with electric circuits to be controlled, said arms carrying contact elements, the contact element of one arm being associated with two of the rings of said distributor and the contact element of the other arm being associated with one of said two rings and with the third ring of the distributor, and guards on the distributor disk for said arm contact elements and said contact rings substantially as specified.

12. In apparatus of the character described wherein is provided a steering wheel post and a steering wheel rotative relatively to the post; a distributor having a plurality of contact rings fixedly secured to the post, means adapted for operation by the thumb of an operator while grasping the steering wheel, including elements associated with said distributor for closing the circuit between selected rings in the distributor, said means comprising two bodies conforming in contour to that of the wheel and hinged together and mounted on the steering wheel proper on an axis normal to the axis of the wheel and an arm carried by each body and provided with a contact member associated with the distributor for the purposes specified.

ALEXANDER M. HUDSON.
CLARENCE H. TWETTEN.